July 10, 1962 W. R. ATTWOOD 3,043,408
METALLIC FRAMING ELEMENT
Filed March 23, 1959

INVENTOR.
WARREN R. ATTWOOD
BY
ATTORNEYS

United States Patent Office 3,043,408
Patented July 10, 1962

3,043,408
METALLIC FRAMING ELEMENT
Warren R. Attwood, 4118 S. Wayne Road, Wayne, Mich.
Filed Mar. 23, 1959, Ser. No. 801,329
10 Claims. (Cl. 189—34)

The present invention relates to metallic framing elements and more specifically to rolled shapes of relatively light sheet metal useful in producing such elements.

A metallic framing element now being marketed under the trade name of "Unistrut" consists of a rectangular section metal channel material in which the frame edges of the channel are turned in at right angles and downward in the channel to provide a rectangular element having a longitudinal slot somewhat narrower than the channel, which slot is bordered by inwardly projecting flanges. This slot is used in fixing the elements together.

These simple elements are used alone or two or more may be welded together to produce other forms in which the slot appears on two opposite sides, in three, or on all four sides.

Among the objects of the present invention is to provide rolled shapes of relatively light sheet metal which, when welded together, produce the more complex shapes, usually with a single welding operation.

Another object is to provide rolled shapes which interfit and may be used in a variety of combinations to produce the several elements mentioned above, that is, with slots in two, three or four faces of a composite member.

Other objects will readily occur to those skilled in the art upon reference to the following description and the accompanying drawing, in which—

Figure 1:
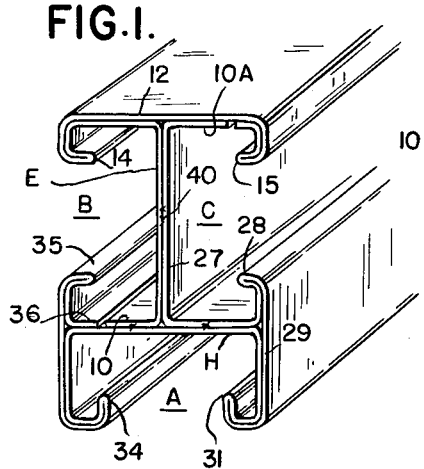
FIG. 1 illustrates the longitudinal flange-bordered slots in three side faces.

Referring to FIG. 1, this shows a structural element consisting of three channels A, B and C, with channels B and C opening laterally, that is, to the longer faces of the rectangle while the channel A opens to the lower shorter face.

The general form of element has heretofore been produced by placing two channel members back to back and welding, and then welding a third channel to the side walls of the first two.

Figure 2:
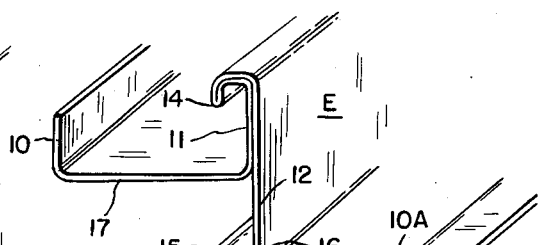
FIG. 2 shows the form of one of the members used in producing the shape shown in FIG. 1.

In the present construction, there is first produced a shape such as is shown in FIG. 2 and designated as a whole by the letter E, by folding or bending a strip of metal preferably light gauge steel, along longitudinal axes to form the shape indicated. This folding or bending of the strips is along a line near one edge to provide a foot 10 at right angles to the strip, then along a line near the center line, the strip is bent at right angles as at 11 in the same direction as foot 10 and doubled back sharply in the opposite direction to provide a portion 12 lying close to the portion 11. The edge portion 13 of the part 12 is then bent back sharply upon itself to provide a double thickness as shown. This double thick edge portion 13, and the double thick portion comprising 11 and 12 are then formed to provide longitudinally extending overhanging flanges 14 and 15. The lines along which the several bends extend should be so chosen that distance between the strip edge 16 and the flat or web portion 17 is equal to the vertical dimension of foot 10.

Figure 3:
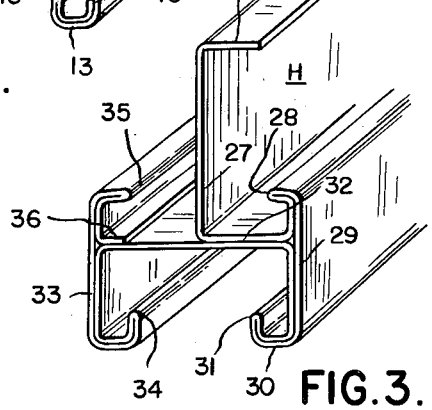
FIG. 3 shows the form of the other member used in producing the same shape.

The shape shown in FIG. 3 and designated as a whole by the letter H, comprises a foot 10A of the same dimension as that in FIG. 2, but a wider strip 27 is used and bent along a plurality of lines to provide a longitudinal flange 28 corresponding to flange 14 of FIG. 2, and face portion 29 corresponding to face portion 12 of FIG. 2. It is then bent back upon itself as at 30 to provide a flange 31 corresponding to flange 15, and instead of the edge being at a location corresponding to the location of edge 16 in FIG. 2, is continued and bent parallel to and closely adjacent to that part of the strip 32 corresponding to the portion 11 of FIG. 2. It is then continued for a distance equal to the width of channel desired and bent down and doubled back on itself to provide a wall 33 of double thickness, this then being bent over to provide a flange 34 facing opposite flange 31. The outer portion of wall 33 is continued upwardly and bent over to provide a flange 35 with the extreme edge 36 of the strip located at a distance from the first mentioned portion of strip 27 equal to the width of the foot 10A.

As shown in FIG. 1, this shape is produced when one each of the forms E and H are properly mated. In this figure, the web portions 27 and 17 are placed back to back with the foot 10 in the space between edge 36 and web portion 27 and the foot 10A in the space between web 17 and the extreme edge adjacent flange 15. The two webs 27 and 17 are then spot welded as at 40 to produce the shape of FIG. 1.

Figure 4:
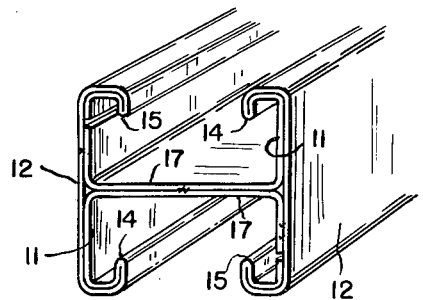
FIG. 4 shows a shape produced from two of the members shown in FIG. 2.
Figure 5:
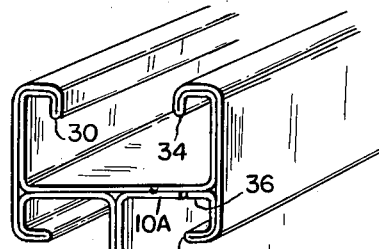
FIG. 5 shows a shape produced from two of the members shown in FIG. 3.

As shown in FIG. 4, welding together the webs of two of the shapes E, will produce a member having opposite flanged slots and if two of the shapes H have their webs 27 welded together, there is produced a shape such as that of FIG. 5 in which the rectangular member shows the flanged slots in all four faces.

I claim:

1. A fabricated sheet metal structural beam for building structures comprising an elongated member generally rectangular in cross section and having in its side faces and one of its ends faces longitudinal slots of less width than its respective face, each slot having its edges turned inwardly to provide flanges, said structural beam comprising a pair of separate longitudinally arranged mating tractors having web portions welded together back to back, one of which comprises a metal strip portion formed to provide one edge only of each of the slots in a side face, the other mating member comprising a metal strip portion similarly formed to provide the other slot edge in the side faces, the last mentioned mating member being also formed to provide both the slot edges and inturned flanges in the end face.

2. A fabricated sheet metal T-section having a head portion and adapted for use in producing rectangular fabricated structural beam comprising at least a pair of said T-sections and having in their side faces longitudinal slots provided with inturned flanges along the slot edges, said T-section comprising a strip of metal formed along longitudinal axes to provide a web portion having at one side a foot portion laterally extended at right angles to the plane of the web, and having the metal at the other side of the web bent up at a right angle, then doubled back upon itself to below the web and again doubled back upon itself and having the apex portions of said doubled back bends bent over and downwardly toward the web, said doubled back apex portions forming the flanges of separate slots, said foot portion adapted to seat against the head portion of a separate T-section to which same is secured to complete said rectangular structural beam.

3. A fabricated structural beam comprising a pair of mated elongated T-sections, each of said T-sections having a head and web portion, a foot extended laterally from the edge of said web portion remote from the head and parallel to the plane of the head portion, the web portions of said T-sections secured together back to back, the foot of each T-section seated against the underside of the head portion of said other T-section.

4. A fabricated structural beam comprising a pair of mated elongated T-sections, each of said T-sections having a head and web portion, a foot extended laterally from the edge of said web portion remote from the head and parallel to the plane of the head portion, the web portions of said T-sections secured together back to back, the underside face of the head portion of each T-section provided with a recess to one side only of the web portion, the foot of each T-section seated in the recess on the underside face of the head portion of said other T-section.

5. A fabricated structural beam comprising a pair of mated elongated T-sections, each of said T-sections having a head and web portion, a foot extended laterally from the edge of said web portion remote from the head and parallel to the plane of the head portion, the web portions of said T-sections secured together back to back, the foot of each T-section seated flush against the underside of the head portion of said other T-section, each head portion provided with return bent inwardly extending flanges along each longitudinal edge thereof, the return bent flanges of one T-section coacting with the return bent flanges of said other T-section to define a slot.

6. A fabricated structural beam comprising a pair of mated elongated T-sections, each of said T-sections having a head and web portion, a foot extended laterally from the edge of said web portion remote from the head and parallel to the plane of the head portion, the web portions of said T-sections secured together back to back, the foot of each T-section seated flush against the underside of the head portion of said other T-section, each head portion provided with return bent inwardly extending flanges along each longitudinal edge thereof, the return bent flanges of one T-section coacting with the return bent flanges of said other T-section to define a slot, at least one of said T-sections formed with outwardly projecting side extensions disposed along the longitudinal edge thereof parallel with the web portion and provided with inwardly extending return bent flanges defining a slot spaced from the outer surface of the head portion substantially the same distance as the spacing of said first mentioned slot from the plane of the web portion and to thereby provide a substantially rectangular structural beam having longitudinally extending slots on at least three sides thereof.

7. A fabricated structural beam assembly comprising a pair of mated elongated T-sections, each of said T-sections having a head portion and a web portion of about half the cross-sectional thickness of the head portion, the web portions of said T-sections disposed back to back, and means securing said T-sections together whereby to provide an I-beam section of approximately uniform thickness overall.

8. The structural beam as defined in claim 7 and in which at least one T-section head portion is formed to provide an outwardly opening longitudinal channel.

9. A fabricated structural beam assembly comprising a pair of elongated T-sections having head and web portions, the web portion of each section comprising substantially identical structural portions in cross-section, said head portion of each section comprising dissimilar structural portions in cross-section, and means selectively securing the web portions of said T-sections back-to-back whereby to selectively provide fabricated beam structures of more than two cross-sectional designs.

10. A fabricated structural beam assembly as defined in claim 9 wherein the head portions of said T-sections are provided with return bent inwardly extending flanges along each longitudinal edge thereof, the return bent flanges of one T-section coacting with the return bent flanges of said other T-section to define a slot.

References Cited in the file of this patent

UNITED STATES PATENTS

| | | |
|---|---|---|
| 1,586,053 | Snyder | Mar. 25, 1926 |
| 2,065,378 | Kling | Dec. 22, 1936 |

FOREIGN PATENTS

| | | |
|---|---|---|
| 577,547 | Great Britain | May 22, 1946 |
| 1,092,541 | France | Nov. 10, 1954 |